United States Patent [19]

Schlatter

[11] 3,805,174

[45] Apr. 16, 1974

[54] TRANSFORMER COUPLED SIGNAL POWER FEEDBACK CIRCUIT

[75] Inventor: Gerald Lance Schlatter, Boulder, Colo.

[73] Assignee: International Telephone and Telegraph Corporation, New York, N.Y.

[22] Filed: Nov. 22, 1972

[21] Appl. No.: 308,759

Related U.S. Application Data

[62] Division of Ser. No. 161,025, July 9, 1971, Pat. No. 3,776,024.

[52] U.S. Cl. .................... 328/261, 307/296, 323/45, 331/185

[51] Int. Cl. .......................................... H01j 19/82

[58] Field of Search ........... 307/296; 331/185, 186, 331/71; 328/261, 259; 323/45

[56] References Cited

UNITED STATES PATENTS

| | | | |
|---|---|---|---|
| 3,293,530 | 12/1966 | Baude | 307/296 X |
| 3,248,634 | 4/1966 | Fudaley et al. | 321/2 |

*Primary Examiner*—Stanley D. Miller, Jr.
*Attorney, Agent, or Firm*—A. Donald Stolzy

[57] ABSTRACT

An alternating signal is transformer coupled to an input circuit with rectification to provide an isolated source of potential without the use of a power supply.

4 Claims, 2 Drawing Figures

TRANSFORMER COUPLED SIGNAL POWER FEEDBACK CIRCUIT

This application is a division of copending application, Ser. No. 161,025, filed July 9, 1971 now U.S. Pat. No. 3,776,024. The benefit of the filing date of said copending application is, therefore, hereby claimed for this application.

BACKGROUND OF THE INVENTION

This invention relates to the art of measuring the density of a fluid or the like, and more particularly, to vibration densitometer circuits.

There is a prior art disadvantage that concerns a safety requirement of circuit isolation. This makes it necessary to provide two power supplies.

SUMMARY OF THE INVENTION

In accordance with the device of the present invention, the above-described and other disadvantages of the prior art are overcome by providing a transformer coupled signal output which acts as a source of power so that an additional power supply is not needed.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
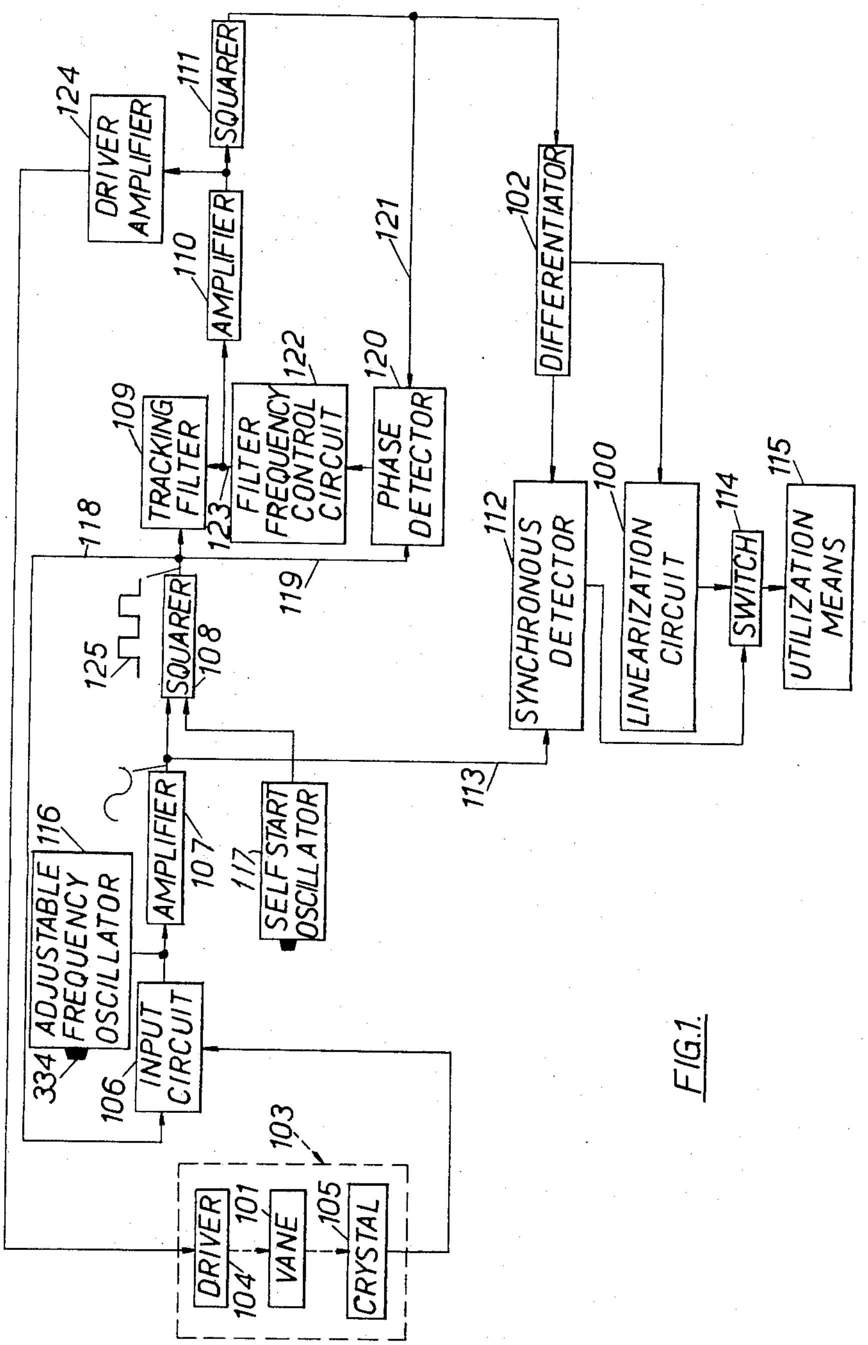
FIG. 1 is a block diagram of a vibration densitometer.

In FIG. 1, a vibration densitometer probe 103 is shown including a magnetostrictive driver 104, a vane 101 and a piezoelectric crystal 105.

Probe 103 may be identical to that disclosed in copending application Ser. No. 65,371 filed Aug. 20, 1970 now U.S. Pat. No. 3,677,067, for Densitometer by C. E. Miller and G. L. Schlatter. The entire disclosure of this application is hereby incorporated by this reference hereto into the present application. The same is true of copending application Ser. No. 131,131 filed Apr. 5, 1971, for Densitometer And Calibration Method And Apparatus Therefor by G. L. Schlatter.

The output of crystal 105 is connected to an input circuit 106. An amplifier 107, a squarer 108, a tracking filter 109, an amplifier 110 and a squarer 111 are connected in succession in that order from input circuit 106 to a differentiator 102. Outputs of the differentiator 102 are connected to a synchronous detector 112 and to a linearization circuit 100. Synchronous detector 112 also receives an input over a lead 113 from the output of amplifier 107. The output of the synchronous detector 112 controls a switch 114 connected between linearization circuit 100 and utilization means 115. An adjustable frequency oscillator 116 is connected to the input of amplifier 107. A self-start oscillator 117 is connected to squarer 108. The output of squarer 108 is impressed over a lead 118 on input circuit 106, and over a lead 119 on a phase detector 120. Phase detector 120 receives a second input on a lead 121 connected from the output of squarer 111. A filter frequency control circuit 122 is connected from the output of phase detector 120 to the control input of tracking filter 109. The output lead 123 of circuit 122 forms both the control input of filter 109 and the filtered output thereof.

A driver amplifier 124 is connected from the output of amplifier 110 to driver 104.

Input circuit 106 contains a differentiator which produces an output signal 90° out of phase with the output signal of crystal 105. The output signal of tracking filter 109 introduced to amplifier 110, is also 90° out of phase with the input signal to tracking filter 109 from squarer 108. The two 90° phase shifts produced in input circuit 106 and tracking filter 109 make it a simple matter to connect the output of driver amplifier 124 to driver 104 in a manner to obtain resonance. That is, vane 101 is driven at its natural resonant frequency.

As will be explained, lead 118 supplies an isolated source of potential to input circuit 106.

Oscillator 116 is employed in calibration.

Oscillator 117 is employed to insure self-starting. Synchronous detector 112 causes switch 114 to clamp the output of circuit 100 to a constant value when resonance does not occur.

Utilization means 115 may take any of several desired forms. When switch 114 passes the output of circuit 100, this output is directly proportional to the density of the fluid in which the probe 103 is submerged. Utilization means 115 may thus be a voltmeter or ammeter calibrated in density, as desired. Alternatively, utilization means 115 may be a process controller.

Probe 103, oscillator 116, oscillator 117, tracking filter 109, filter frequency control circuit 122, phase detector 120, amplifier 110, amplifiers 124, squarer 111, differentiator 102, synchronous detector 112, linearization circuit 100, switch 114 and utilization means 115 in FIG. 1 may be, if desired, identical to the respective ones of these in the said copending application Ser. No. 161,025.

OPERATION

In the operation of the vibration densitometer shown in FIG. 1, probe 103 is submerged in a fluid. Self-start oscillator 107 causes vane 101 to be driven to its resonant frequency. This frequency appears as a square wave 125 at the output of squarer 108. Filter 109 has a passband which is movable in accordance with a signal transmitted thereto on lead 123. The passband of filter 109 is thus centered on the frequency of the pulses at 125. This is done by phase detector 120 which compares the filter output to the filter input and causes circuit 122 to vary the passband location of filter 109 in accordance with the difference therebetween.

Linearization circuit 100 produces an output signal directly proportional to density. Synchronous detector 112 suppresses the output of circuit 100 through switch 114 when resonance does not occur.

Switch 114, in actuality, grounds the output of circuit 100 or applies it directly to utilization means 115 depending upon the output signal of synchronous detector 112.

As stated previously, this application is a division of copending application Ser. No. 161,025. By this reference hereto, the entire disclosure of said copending parent application, Ser. No. 161,025, except that duplicated herein, is hereby incorporated herein hereat in lieu of some common disclosure cancelled herefrom. As filed, both disclosures were identical except for the claims.

Figure 2:
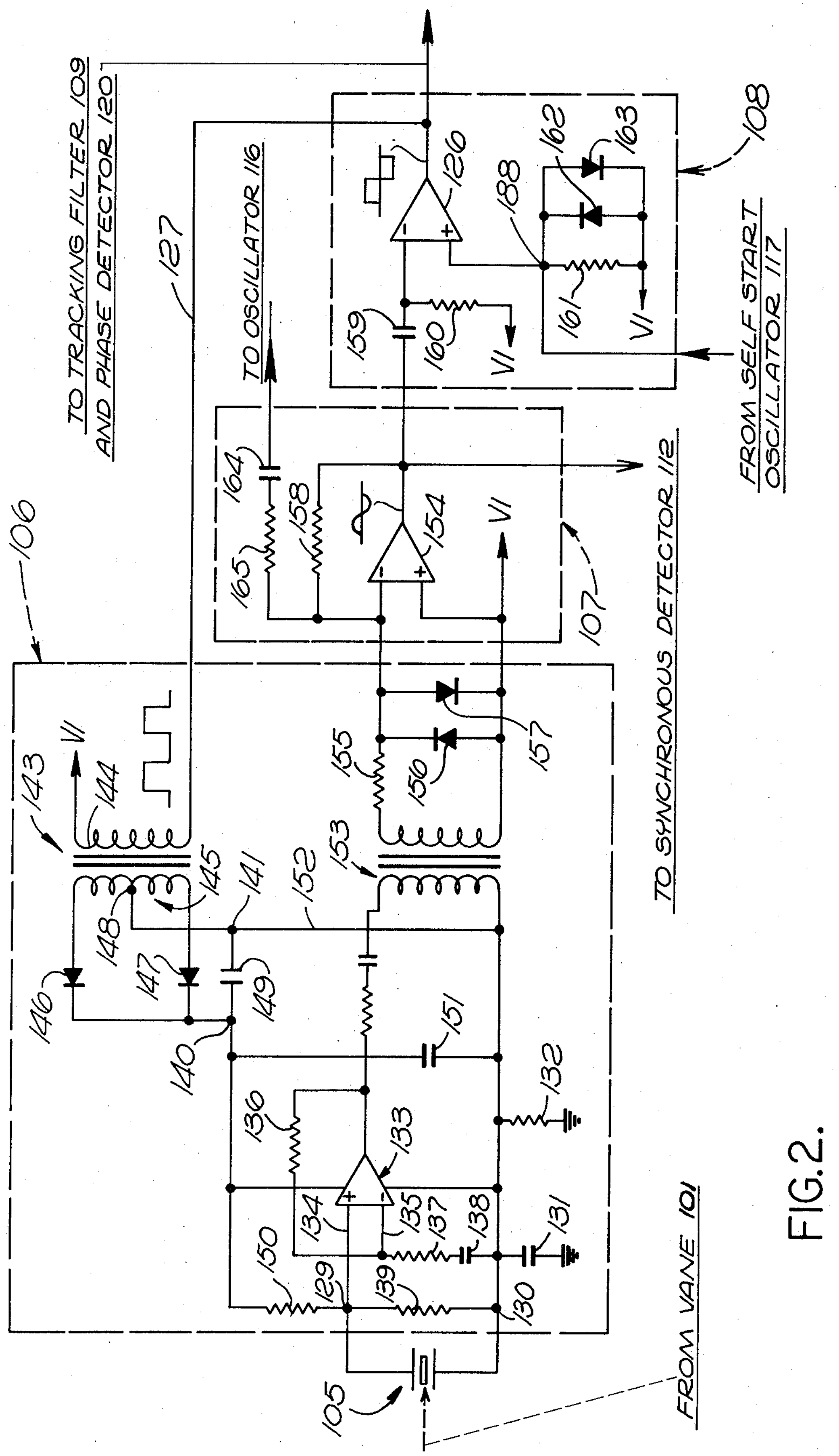
FIG. 2 is a schematic diagram of a portion of the blocks shown in FIG. 1.

In FIG. 2, input circuit 106 is shown connected from crystal 105. Also shown are amplifier 107 and squarer 108.

In FIG. 2, input circuit 106 is connected from crystal 105 at junctions 129 and 130. A capacitor 131 and a resistor 132 are connected from junction 130 to ground. A differential amplifier 133 has a noninverting input 134 and an inverting input 135. A feedback resistor 136 is connected from the output of amplifier 133 to the inverting input 135 thereof. A resistor 137 and a capacitor 138 are connected in succession in that order from the inverting input 135 of amplifier 133 to junction 130. A resistor 139 is connected between junctions 129 and 130.

Input circuit 106 has power input terminals 140 and 141 connected from the output of amplifier 126 over a lead 127 to a transformer 143. Transformer 143 has a primary winding 144 connected from lead 127, and a secondary winding 145 with its ends connected to terminal 140 through diodes 146 and 147. Secondary 145 has a center tap 148 connected to terminal 141. A capacitor 149 is connected between terminals 140 and 141 to reduce the ripple. A resistor 150 is connected from junction 129 to terminal 140. A capacitor 151 is connected between terminal 140 and junction 130. A lead 152 connects terminal 141 to junction 130. The output of the circuit 106 is transformer coupled at 153 to an amplifier 154 in amplifier 107 through a resistor 155 and diodes 156 and 157. Amplifier 154 has a feedback resistor 158. Squarer 108 is connected from the output of amplifier 154, and includes a coupling capacitor 159, a bias resistor 160, a bias resistor 161 and diodes 162 and 163.

Amplifier 107 has a coupling capacitor 164 and a series resistor 165 connected from oscillator 116.

Throughout the drawings, V2 may, if desired, be 24 volts, and V1 may be 12 volts.

In accordance with the present invention the output of amplifier 126 on lead 127 in FIG. 2 supplies operating power through transformer 143 to input circuit 106.

What is claimed is:

1. In an oscillation circuit, the combination comprising: a first circuit having a pair of terminals requiring electric power thereat for operation; a first transformer having a first primary and a first secondary, said first primary being connected from the output of said first circuit; first means to excite said first circuit to cause an alternating signal to be impressed across said first primary; a second circuit having an input connected from said first secondary, and an output; a second transformer having a second primary and a second secondary, said second primary being connected from said second circuit output; and second means connecting said second secondary to said terminals to supply electric power thereat.

2. The invention as defined in claim 1, wherein said second means includes rectifier means by which a D.C. voltage is applied between said terminals.

3. The invention as defined in claim 2, wherein at least one of said circuits includes an amplifier.

4. The invention as defined in claim 3, wherein each of said circuits includes at least one amplifier, said second secondary having a center tap connected to one of said terminals, each end of said second secondary being connected to the other terminal by a diode poled in a direction theretoward.

* * * * *